United States Patent Office 2,744,099
Patented May 1, 1956

2,744,099

RUBBERY INTERPOLYMERS OF A BUTADIENE-1,3 HYDROCARBON, AN ALKYL ACRYLATE AND A STYRENE HYDROCARBON

George R. Mitchell, Pine Orchard, Conn., and Neil H. Sherwood, Avon Lake, Ohio, assignors to The B. F. Goodrich Company, New York, N. Y., a corporation of New York No Drawing. Application September 17, 1952, Serial No. 310,146

8 Claims. (Cl. 260—80.7)

This invention relates to synthetic rubber and more particularly relates to interpolymers of a butadiene-1,3 hydrocarbon, an alkyl acrylate and a styrene hydrocarbon.

The preparation of synthetic rubbers of the butadiene polymer type with properties suitable for manufacture of articles subjected to low temperature service, as for manufacture of tires and other rubber articles for use in high altitude aircraft and similar applications, has long been an objective of polymerization chemists. Existing butadiene type synthetic rubbers do not fulfill the requirements for low temperature service in either tires or mechanical goods. It is well known that polybutadiene is superior to other synthetic rubbers in low temperature properties but it has not proved suitable because of its poor processability and the inferior physical properties of its vulcanizates. Attempts have also been made to utilize copolymers of butadiene and styrene with low styrene content, but such attempts have not been successful due to failure to obtain the proper combination of the required processability, low temperature flexibility and other physical properties.

We have now discovered a synthetic rubber, prepared by polymerizing in aqueous emulsion a monomeric mixture composed predominately of a butadiene-1,3 hydrocarbon and small amounts of an alkyl acrylate and a styrene hydrocarbon, that is processable in standard factory equipment, and when vulcanized has good low temperature flexibility, satisfactory physical properties for use both in tires and mechanical goods and in addition has outstanding tread wear resistance in tires.

These unexpected improvements are attained through the use of small amounts of the alkyl acrylate and the styrene hydrocarbon as copolymerizable comonomers in a monomer mixture which is predominately a butadiene-1,3 hydrocarbon. The resulting interpolymers may be considered as internally plasticized, internally reinforced polybutadiene, since they far surpass any previously known modified polybutadiene in processing characteristics and physical properties, with only a negligible decrease in low temperature flexibility as compared to straight polybutadiene.

In the preferred practice of this invention, a monomer mixture of 85 percent by weight of butadiene-1,3, 10 per cent by weight of alkyl acrylate and 5 per cent by weight of styrene is polymerized in aqueous emulsion at about 45° F. to about 60 percent conversion of monomers to polymer. The reaction is stopped with a reducing agent and the excess monomers stripped off as by the use of steam and an anti-oxidant added to the latex. The latex is then coagulated as by the addition of sodium chloride and dilute acid, and the resulting rubber washed with water and dried. This rubber processes very readily in standard factory equipment, and when compounded in a tread recipe and cured, has good low temperature flexibility equal to or better than natural rubber, a lower crystallization tendency than natural rubber and road wear better than the best synthetic rubbers now used in tires.

The ratio of the monomers used in the polymerization is quite critical and rather narrow limits must be observed to obtain the improved rubbery interpolymer of the invention. While the 85 butadiene-1,3:10 alkyl acrylate:5 styrene percent by weight ratio is optimum and preferred, it is possible, while still securing interpolymers having improved properties, to employ monomer mixtures containing from 78 to 92 percent by weight of the butadiene-1,3 hydrocarbon, from 5 to 15 percent by weight of the alkyl acrylate and from 3 to 7 percent by weight of the styrene hydrocarbon. More preferred ratios are from 84 to 86 percent by weight of butadiene-1,3 hydrocarbon, from 9 to 11 percent by weight of alkyl acrylate and from 4 to 5 percent by weight of styrene hydrocarbon.

The nature of the monomeric mixture polymerized is also somewhat critical. The butadiene-1,3 hydrocarbon is preferably butadiene-1,3 but isoprene, dimethyl butadiene and piperylene may be substituted in part or for all of the butadiene-1,3.

Any of the alkyl acrylates may be utilized in the monomeric mixture, but those containing from 4 to 8 carbon atoms in the alkyl group are preferred. Illustrative alkyl acrylates which may be employed are methyl acrylate, ethyl acrylate, n-propyl acrylate, isopropyl acrylate, n-butyl acrylate, sec-butyl acrylate, isobutyl acrylate, n-amyl acrylate, isoamyl acrylate, hexyl acrylate, n-octyl acrylate, iso-octyl acrylate, nonyl acrylate, decyl acrylate and the like as well as mixtures of these alkyl acrylates.

The styrene hydrocarbon used in the monomeric mixture is preferably styrene but its homologs such as the vinyl toluenes, ethyl styrenes and alpha methyl styrene may be substituted for all or a part of the styrene.

The temperature at which the polymerization is conducted is rather critical because of its effect upon such physical properties of the rubber as tensile strength. When the interpolymer is prepared by polymerization at 122° F., there is a loss in tensile strength, and certain other properties are not as good as those of the polymer prepared at 41° F. Interpolymers prepared at 14° F. show no outstanding advantage over polymer prepared at 41° F., so that the preferred range of polymerization temperatures is 10 to 90° F. with 40 to 50° F. most practical and useful.

The polymerization recipe employed may be any of those emulsion types known to and used in the art. Any of the usual polymerization emulsifiers such as the fatty acid and rosin acid soaps may be used along with a catalyst or initiator preferably in an activated recipe. Any of the well known activator systems such as the polyethylene polyamines, ferrous gluconate, ferrous silicate, iron pyrophosphate, sugar and others may be used to activate any of the usual initiators or catalysts such as the organic peroxides and hydroperoxides, persulfates and other peroxygen compounds and other free radical forming initiators. As modifiers, small quantities of the alkyl mercaptans, such as those containing from 8 to 18 carbon atoms may be used, if desired.

Other than temperature, the critical factor involved in the polymerization is the monomer ratio employed, and not the auxiliary catalysts, initiators, activators, emulsifiers etc. of the polymerization system.

The practice of this invention will be more clearly demonstrated in the following specific examples.

EXAMPLE 1

The following materials in the proportions indicated are used in producing a preferred interpolymer of this invention by means of an aqueous emulsion polymerization reaction.

| Material: | Parts by weight |
|---|---|
| Water | 180.0 |
| Ethyl acrylate | 10.0 |
| Styrene | 5.0 |
| Butadiene-1,3 | 85.0 |
| Disproportionated rosin acid soap | 3.76 |
| Fatty acid soap | 0.94 |
| Naphthalene sulfonic acid—formaldehyde salt | 0.10 |
| NaOH | 0.05 |
| KCl | 0.50 |
| $FeSO_4.7H_2O$ | 0.14 |
| $K_4P_2O_7$ | 0.177 |
| Cerelose | 1.0 |
| Tertiary dodecyl mercaptan | 0.25 |
| Cumene hydroperoxide | 0.10 |
| Sodium dimethyl dithiocarbamate | 0.1 |
| Goodrite Stalite [1] | 2.0 |

[1] Mono and dialkylated diphenylamines.

The rosin acid soap, fatty acid soap, aralkylated sulfonate and sodium hydroxide are dissolved in the water and charged to a pressure autoclave equipped with agitation and cooling facilities. The reactor is then evacuated to remove the oxygen. The butadiene-1,3, ethyl acrylate, styrene and mercaptan modifier are then charged to the reaction vessel. The batch is cooled down to 41° F. While this is cooling, the activator is made up by dissolving the potassium pyrophosphate, potassium chloride and cerelose in water, heating to 212° F. for 2 minutes, cooling to 140° F., adding the ferrous sulfate and holding at 140° F. from 2 to 5 minutes. This mix is cooled to room temperature and charged to the reactor. The reaction vessel is pressured to thirty pounds with nitrogen if necessary and the cumene hydroperoxide injected. Polymerization of the monomers is then allowed to take place with agitation at 41° F. until 60% of the monomers have polymerized whereupon the reaction is shortstopped by adding sodium dimethyl dithiocarbamate to the resulting latex. The excess unreacted monomers are stripped off with steam under vacuum. The antioxidant Stalite is then added to the latex. The latex is creamed with 20% sodium chloride solution and coagulated with 0.5% sulfuric acid solution. The coagulated rubbery interpolymer is washed with water and air dried at 212° F. This interpolymer has a Mooney viscosity value of 64 ML and a Plastograph rating of 2.6, which is the Mooney viscosity decrease per minute for five minutes at 300° F.

This synthetic rubbery interpolymer is compounded in a standard tread type recipe on a rubber mill as follows:

*Tread recipe*

| Material: | Parts by weight |
|---|---|
| Rubbery interpolymer | 100.0 |
| Carbon black-EPC | 40.0 |
| Zinc oxide | 5.0 |
| Sulfur | 2.0 |
| Altax [1] | 3.0 |
| Stearic acid | 1.5 |

[1] Benzothiazyl disulfide.

The following test data on the compounded and vulcanized stock are obtained:

Stress/strain cure @ 292° F.:
  Ultimate tensile strength, p. s. i.—
    25 minute cure _____ 2400
    50 minute cure _____ 2750
    100 minute cure _____ 1950
  Modulus, 300% elongation, p. s. i.—
    25 minute cure _____ 800
    50 minute cure _____ 1300
    100 minute cure _____ 1650
  Elongation, percent—
    25 minute cure _____ 585
    50 minute cure _____ 465
    100 minute cure _____ 330
Gehman freeze —° C.:
  $T_2$ _____ —30
  $T_5$ _____ —54
  $T_{10}$ _____ —58
  $T_{100}$ _____ —63
  Freeze point _____ —65
Crystallization resistance index, percent:
  —13° F. _____ 67
  —25° F. _____ 45
Rate of wear index (vs. GR–S as 100) ___ 130

An unexpected property that the raw interpolymers of this invention exhibits is excellent processability, as measured by the rate of polymer breakdown which is evidenced by the Mooney viscosity decrease at 300° F. for five minutes in the Brabender Plastograph. This breakdown rate is reported as Mooney viscosity decrease per minute. The interpolymer of this example, with a rating of 2.6, is much better than a 90 butadiene-1,3:10 styrene copolymer with a rating of 1.0, and a 90 butadiene-1,3:10 ethyl acrylate copolymer with a rating of 1.7. Further, this interpolymer is far superior to polybutadiene which exhibits processing characteristics worse than the two copolymers cited above unless very special techniques, such as carbon black masterbatching, are employed. These laboratory data are borne out in actual plant practice where it is found that this interpolymer processes satisfactorily in standard processing equipment.

The Gehman freeze point is one measure of the low temperature properties of rubber vulcanizates and is measured by an angular twist freeze method. The low freeze point of this interpolymer is to be compared to natural rubber with a freeze point value of —55° C., polybutadiene at —73° C., a 72 butadiene-1,3:28 styrene copolymer at —46° C. and a 90 butadiene-1,3:10 styrene copolymer at —62° C., as compared to a value of —65° C. for the interpolymer of this example.

The crystallization resistance index is a measure of the tendency of the rubber to crystallize under service type conditions, that is, on long exposure to low temperature. A cured ASTM tensile strip is placed under stress in an insulated box for 24 hours at —13° F. and —25° F. At the end of this time the degree of retraction on release of the stress is measured and compared to retraction at room temperature. 100% is the optimum value. The index of this interpolymer of 67% is to be compared with indices of 42% for natural rubber and 48% for a 90 butadiene-1,3:10 styrene copolymer, clearing showing the unexpected superiority of the interpolymer. This resistance to crystallization exhibited by the interpolymer of this invention is of extreme importance in applications where long periods of exposure to extreme cold are necessary.

The tread wear index is a measure of the most outstanding and unexpected property of the interpolymers of this invention, excellent tread wear resistance. These data are obtained from tests on experimental tires made with the treads of the tires containing the interpolymer of this invention and compounded in standard tread recipes known to those skilled in the art. The tires are road tested and compared to control tires from standard GR–S "cold rubber." Assigning standard GR–S "cold rubber" tires an arbitrary rate of wear index value of 100, tires prepared from the interpolymer of this example have a rate of wear index of 130 when compared to the control tires.

The stress/strain properties of this interpolymer are superior to the stress/strain properties of an equivalent polybutadiene polymer.

EXAMPLE 2

The following materials are used in a polymerization recipe at 41° F., in substantially the same manner as outlined in Example 1.

| Material: | Parts by weight |
|---|---|
| Water | 180.0 |
| n-Octyl acrylate | 10.0 |
| Styrene | 5.0 |
| Butadiene-1,3 | 85.0 |
| Rosin acid soap | 3.76 |
| Fatty acid soap | 0.94 |
| Aralkylated sulfonate salt | 0.10 |
| NaOH | 0.05 |
| KCl | 0.50 |
| $FeSO_4.7H_2O$ | 0.14 |
| $K_4P_2O_7$ | 0.177 |
| Cerelose | 1.0 |
| Tertiary dodecyl mercaptan | 0.25 |
| Cumene hydroperoxide | 0.10 |
| Sodium dimethyl dithiocarbamate | 0.1 |
| Goodrite Stalite | 2.0 |

The latex from this polymerization is creamed and coagulated with 20% sodium chloride and 0.5% sulfuric acid and the coagulated rubbery interpolymer washed with water and air dried at 212° F. This rubbery interpolymer has a Mooney viscosity value of 54 ML and a Plastograph rating of 2.4.

The interpolymer is compounded in the standard tread type recipe given in Example 1. The following test results are obtained on the vulcanized stock.

Stress/strain cure @ 292° F.:
    Ultimate tensile strength, p. s. i.—
        25 minute cure _____ 2400
        50 minute cure _____ 2800
        100 minute cure _____ 2000
    Modulus, @ 300% elongation, p. s. i.—
        25 minute cure _____ 690
        50 minute cure _____ 1200
        100 minute cure _____ 1450
    Elongation, percent:
        25 minute cure _____ 590
        50 minute cure _____ 500
        100 minute cure _____ 380
Gehman freeze —° C.:
    $T_2$ _____ —48
    $T_5$ _____ —60
    $T_{10}$ _____ —63
    $T_{100}$ _____ —68
    Freeze point _____ —69
Crystallization resistance index, percent:
    —13° F _____ —64
    —25° F _____ —44
Rate of wear index (vs. GR–S as 100) _____ 145

This octyl acrylate interpolymer exhibits a lower freeze point and a better tread wear index than does the interpolymer of Example 1.

EXAMPLE 3

A monomeric mixture composed of 85 parts of butadiene-1,3, 10 parts by weight of butyl acrylate, and 5 parts by weight of styrene are polymerized in an aqueous emulsion at 41° F. in substantially the same recipe and manner as given in Example 1. The polymer obtained which possesses a Mooney viscosity of 59 ML, is compounded in the standard tire tread type recipe and the following test results are obtained on the vulcanized stock.

Stress/strain cure @ 292° F.:
    Ultimate tensile strength, p. s. i.—
        25 minute cure _____ 2775
        50 minute cure _____ 2850
        100 minute cure _____ 2525
    Modulus, @ 300% elongation, p. s. i.—
        25 minute cure _____ 810
        50 minute cure _____ 1275
        100 minute cure _____ 1610
    Elongation, percent:
        25 minute cure _____ 675
        50 minute cure _____ 500
        100 minute cure _____ 395
Gehman freeze —° C.:
    $T_2$ _____ —31
    $T_5$ _____ —51
    $T_{10}$ _____ —56
    $T_{100}$ _____ —65
    Freeze point _____ —63

The vulcanized interpolymers of this invention find many uses in low temperature service applications because of low temperature flexibility, low crystalline tendency, abrasion and wear resistance and other good physical properties. Advantage may be taken of these outstanding properties because of the ease with which the raw interpolymer may be processed into such objects as mechanical goods and parts as well as tires.

Although we have specifically described representative embodiments of the invention, it will be apparent to those skilled in the art that the invention is not limited to the specific examples given, but only as required by the spirit and scope of the appended claims.

We claim:

1. A synthetic rubbery interploymer prepared by polymerizing to a conversion of about 60 percent in aqueous emulsion at a temperature of 40 to 50° F. a monomeric mixture consisting of 81 percent by weight of butadiene-1,3, 10 percent by weight of an alkyl acrylate containing 4 to 8 carbon atoms in the alkyl group and 1 percent by weight of styrene.

2. A synthetic rubbery interploymer prepared by polymerizing in aqueous emulsion at a temperature of about 10° F. to 90° F. a monomeric mixture consisting essentially of about 84 to 86 percent by weight of a butadiene-1,3 hydrocarbon, about 9 to 11 percent by weight of at least one alkyl acrylate containing not more than 10 carbon atoms in the alkyl group and about 3 to 7 percent by weight of a polymerizable styrene hydrocarbon.

3. A synthetic rubbery interpolymer prepared by polymerizing in aqueous emulsion at a temperature of about 10° F. to 90° F. a monomeric mixture consisting of from 84 to 86 percent by weight of butadiene-1,3, 9 to 11 percent by weight of an alkyl acrylate containing 1 to 8 carbon atoms in the alkyl group and 4 to 5 percent by weight of a polymerizable styrene hydrocarbon.

4. The interpolymer of claim 3 wherein the alkyl acrylate is ethyl acrylate and the polymerizable styrene hydrocarbon is styrene.

5. A synthetic rubbery interpolymer prepared by polymerizing in aqueous emulsion at a temperature of about 10° F. to 90° F. a monomeric mixture consisting of from 84 to 86 percent by weight of butadiene-1,3, 9 to 11 percent by weight of an alkyl acrylate containing 4 to 8 carbon atoms in the alkyl group and 4 to 5 percent by weight of styrene.

6. The interpolymer of claim 5 wherein the alkyl acrylate is butyl acrylate.

7. The interpolymer of claim 5 wherein the alkyl acrylate is an octyl acrylate.

8. The process which comprises polymerizing in aqueous emulsion at a temperature of about 10° F. to 90° F. a monomeric mixture consisting essentially of about 84 to 86 percent by weight of a butadiene-1,3 hydrocarbon, about 9 to 11 percent by weight of at least one alkyl acrylate containing not more than 10 carbon atoms in the alkyl group and about 3 to 7 percent by weight of a polymerizable styrene hydrocarbon.

References Cited in the file of this patent

UNITED STATES PATENTS

| | | |
|---|---|---|
| 2,384,571 | Semon | Sept. 11, 1945 |

FOREIGN PATENTS

| | | |
|---|---|---|
| 360,822 | Great Britain | Oct. 30, 1931 |